United States Patent
Rubel et al.

(10) Patent No.: US 10,551,491 B2
(45) Date of Patent: Feb. 4, 2020

(54) SYSTEMS AND METHODS FOR PERFORMING SYNTHETIC APERTURE RADAR IMAGING USING SUPERCHIRPS

(71) Applicant: Planet Labs Inc., San Francisco, CA (US)

(72) Inventors: Michael Rubel, San Francisco, CA (US); Creon Levit, San Francisco, CA (US); Matthew Ferraro, San Francisco, CA (US)

(73) Assignee: Planet Labs Inc., San Francisco, CA (US)

( * ) Notice: Subject to any disclaimer, the term of this patent is extended or adjusted under 35 U.S.C. 154(b) by 224 days.

(21) Appl. No.: 15/640,280

(22) Filed: Jun. 30, 2017

(65) Prior Publication Data

US 2018/0259639 A1    Sep. 13, 2018

Related U.S. Application Data

(60) Provisional application No. 62/470,091, filed on Mar. 10, 2017.

(51) Int. Cl.
*G01S 13/90* (2006.01)
*G01S 13/00* (2006.01)

(52) U.S. Cl.
CPC ......... *G01S 13/904* (2019.05); *G01S 13/9041* (2019.05)

(58) Field of Classification Search
CPC .... G01S 13/904; G01S 13/26; G01S 13/9041; G01S 13/346; G01S 7/006; G01S 13/284;
(Continued)

(56) References Cited

U.S. PATENT DOCUMENTS 4,707,839 A * 11/1987 Andren ............... H04B 1/7093
                                                        375/150
5,436,973 A   7/1995 Amoroso
(Continued)

FOREIGN PATENT DOCUMENTS

EP         2650695 B1   10/2015
WO    WO01/67652 A1 *  9/2001 ............... H04B 1/69
(Continued)

OTHER PUBLICATIONS

S. R. Pillai et al., "A New Estimation Technique for High-Resolution Bathynnetry"; printed in the journal, "Signal Processing"; vol. 80; pp. 809-818; printed in the year 2000. (Year: 2000).*
(Continued)

*Primary Examiner* — Bernarr E Gregory
(74) *Attorney, Agent, or Firm* — KPPB LLP

(57) ABSTRACT

Synthetic aperture radar (SAR) imaging systems that transmit repeated waveforms based upon pseudonoise sequences to generate SAR imaging data in accordance with various embodiments of the invention are disclosed. A synthetic aperture radar in accordance with one embodiment of the invention includes: a transmitter configured to transmit superchirps, where the superchirp is generated by convolving a kernel with a pseudonoise modulated impulse sequence having a flat power spectrum; a receiver configured to receive backscatters of transmitted superchirps and digitize the received backscatters; and signal processing circuitry configured to perform matched filtering on digitized backscatters.

20 Claims, 6 Drawing Sheets

(58) Field of Classification Search
CPC ..... G01S 13/90; H04B 1/7183; H04B 1/7143; H04B 1/69; H04B 1/7093; H04L 1/0631
See application file for complete search history.

(56) References Cited

U.S. PATENT DOCUMENTS

| | | | | |
|---|---|---|---|---|
| 6,064,695 | A * | 5/2000 | Raphaeli | H04B 1/69 375/135 |
| 6,597,309 | B1 | 7/2003 | Panton et al. | |
| 7,010,067 | B2 * | 3/2006 | Chamberlain | H04B 1/69 375/343 |
| 7,035,310 | B1 * | 4/2006 | Roberts | H04B 1/7143 375/132 |
| 8,249,128 | B2 * | 8/2012 | Kunysz | H04B 1/7183 375/130 |
| 8,290,462 | B2 * | 10/2012 | Azadet et al. | H04L 1/0631 455/272 |
| 8,441,393 | B2 * | 5/2013 | Strauch et al. | G01S 7/006 342/60 |
| 2002/0094042 | A1 * | 7/2002 | Chamberlain | H04B 1/69 375/343 |
| 2003/0202731 | A1 | 10/2003 | Lonov et al. | |
| 2007/0248145 | A1 * | 10/2007 | Kunysz | H04B 1/7183 375/130 |
| 2010/0039313 | A1 | 2/2010 | Morris | |
| 2010/0197264 | A1 | 8/2010 | Azadet et al. | |
| 2011/0193739 | A1 * | 8/2011 | Strauch | G01S 7/006 342/146 |
| 2012/0230371 | A1 * | 9/2012 | Chiskis | G01S 13/284 375/143 |
| 2012/0268315 | A1 | 10/2012 | Tirkel et al. | |
| 2014/0009326 | A1 | 1/2014 | Wishart | |

FOREIGN PATENT DOCUMENTS

| | | | | |
|---|---|---|---|---|
| WO | WO2012/120137 | A1 * | 9/2012 | ............ G01S 13/90 |
| WO | 2018165479 | A1 | 9/2018 | |

OTHER PUBLICATIONS

"Spaceborne Polarimetric Synthetic Aperture Radar", Dipartimento di Ingengneria Civile e Ingengneria Informatica—DICII, Retrieved on Mar. 6, 2017, 108 pgs.

Alfonzo et al., "Orthogonal Waveform Experiments with a Highly Digitized Radar", EUSAR 2012, pp. 103-106, 2012.

Chen et al., "A Novel Image Formation Algorithm for High-Resolution Wide-Swath Spaceborne SAR Using Compressed Sensing on Azimuth Displacement Phase Center Antenna", Progress in Electromagnetics Research, 2012, vol. 125, pp. 527-542.

Ender, "Space-time processing for multichannel synthetic aperture radar", Electronics & Communication Engineering Journal, Feb. 1999, pp. 29-38.

Horn, "Interesting eigenvectors of the Fourier transform", Transactions of the Royal Society of South Africa, Jun. 2010, vol. 65, No. 2, pp. 100-106.

Muehe et al., "Displaced-Phase-Center Antenna Technique", Lincoln Laboratory Journal, 2000, vol. 12, No. 2, pp. 281-296.

Rajagopal et al., "FPGA Implementation of Pseudo Noise Sequences Based on Quadratic Residue Theory", International Journal of Computer Applications (0975-8887), Jan. 2016, vol. 134, No. 9, pp. 10-14.

Unknown, "Appendix A—Principles of Synthetic Aperture Radar", University of California San Diego, Class: Satellite Remote Sensing—SIO 135/SIO 236, Retrieved on Mar. 1, 2017, pp. A1-14.

Unknown, "Synthetic-Aperture Radar (SAR) Basics", The University of Kansas, C. Allen, Retrieved on Mar. 6, 2017, 93 pgs.

International Preliminary Report on Patentability for International Application PCT/US2018/021618, Report issued Jun. 20, 2019, Dated Jul. 5, 2019, 18 Pgs.

International Search Report and Written Opinion for International Application No. PCT/US2018/021618, Search completed May 29, 2018, Dated Jun. 11, 2018, 15 Pgs.

\* cited by examiner

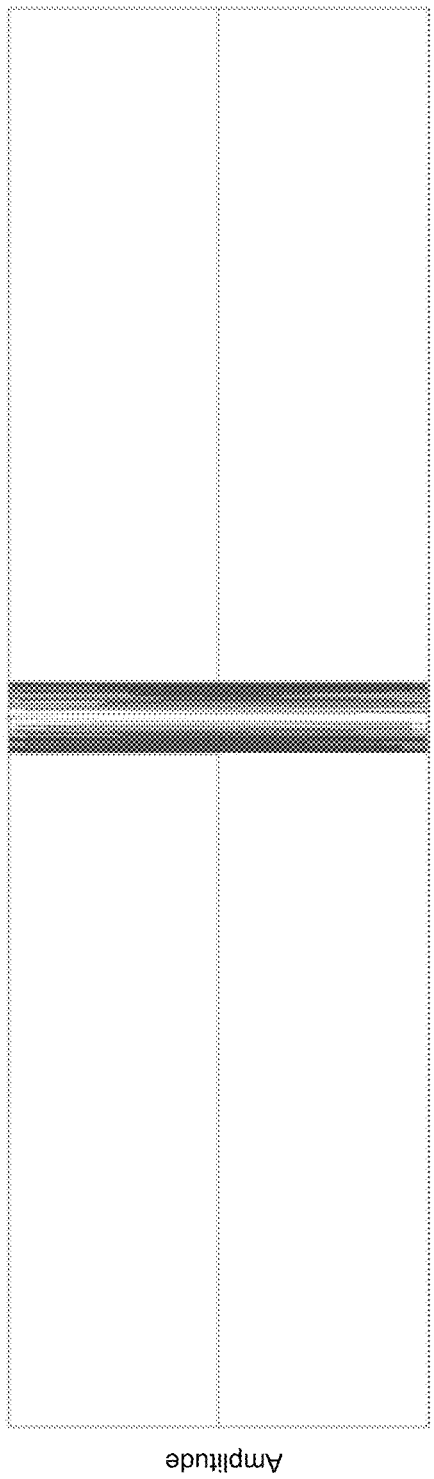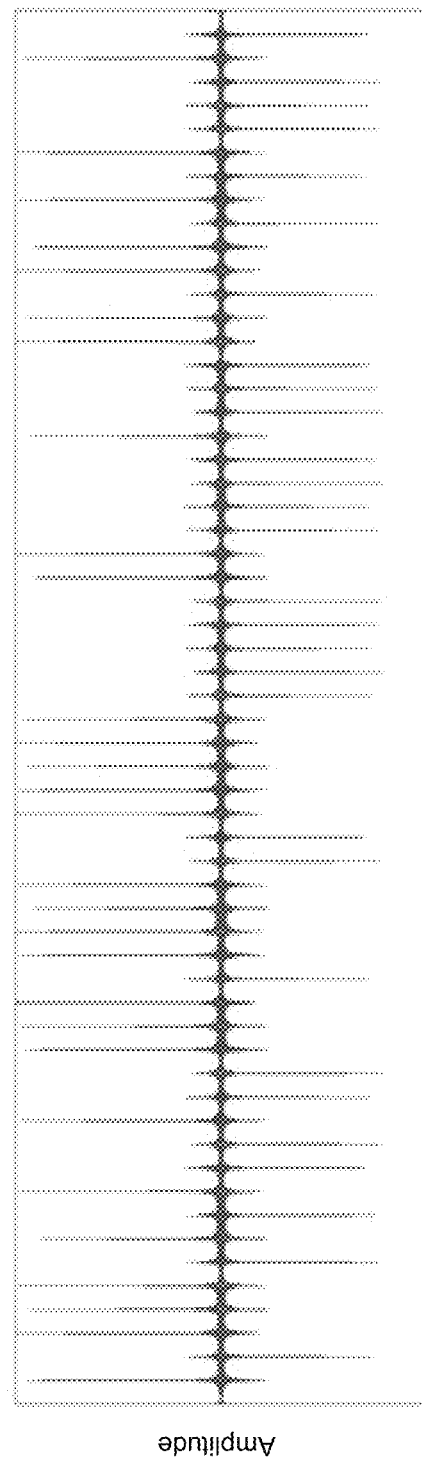

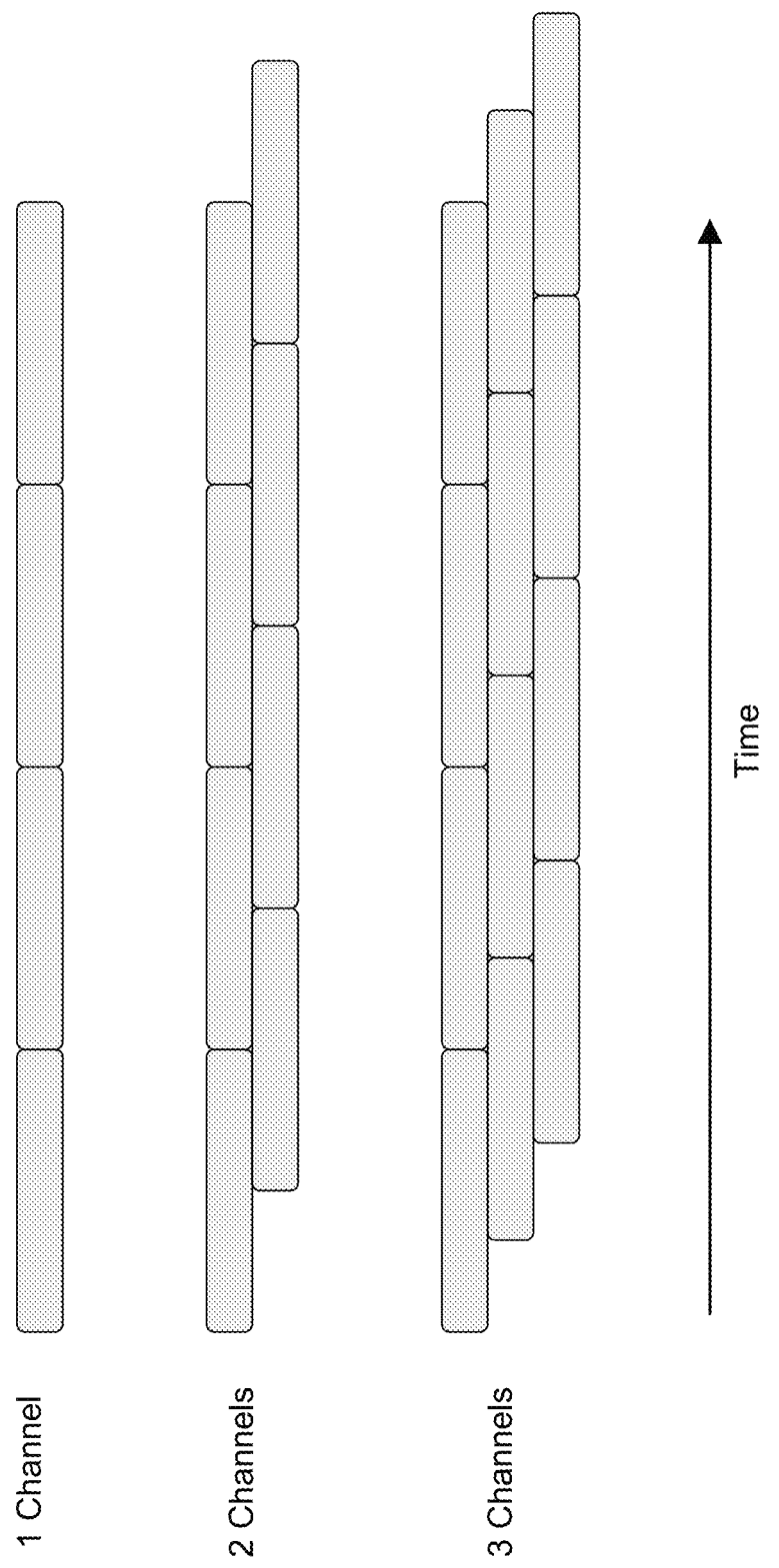

SYSTEMS AND METHODS FOR PERFORMING SYNTHETIC APERTURE RADAR IMAGING USING SUPERCHIRPS

CROSS-REFERENCE TO RELATED APPLICATIONS

The current application claims priority under 35 U.S.C. 119(e) to U.S. Provisional Patent Application Ser. No. 62/470,091, entitled "Systems and Methods for Performing Synthetic Aperture Radar Imaging Using Superchirps", filed Mar. 10, 2017. The disclosure of U.S. Provisional Patent Application Ser. No. 62/470,091 is incorporated herein by reference in its entirety.

FIELD OF THE INVENTION

The present invention relates generally to synthetic aperture radar systems and more specifically to space based synthetic aperture radar systems.

BACKGROUND

The term synthetic aperture radar (SAR) is often used to describe radar systems that use a moving antenna to simulate an extremely large antenna or aperture electronically. SAR systems are often mounted to airborne or space-based platforms and are mounted at an angle relative to the flight path of the platform to which the antenna is mounted. A monostatic SAR utilizes the same platform for the transmitter and receiver.

The flight path of the platform on which a SAR is mounted defines the azimuth direction with the antenna generally focused on a direction orthogonal to the azimuth (See FIG. 1). The direction in which the antenna is directed is often referred to as the range or slant-range. If the direction of observation is perpendicular to the direction of travel, the system is defined as a boresight system. Otherwise it is called a squinted system.

SARs can be configured in strip map mode or spotlight mode. In strip map mode, the SAR transmits coherent pulses in a fixed pointing direction of the radar antenna as the platform moves. In spotlight mode, the SAR steers the radar beam to keep a target within the beam for a longer time. As length of synthetic aperture increases, the azimuth resolution increases. However, the area sampling rate is reduced in spotlight mode relative to the area sampling rate of a strip map mode SAR system that transmits over the same time period.

In a SAR system, data is acquired by transmitting a radio pulse and receiving a signal backscattered by the imaged scene. In such systems, resolution in range increases with the bandwidth of the transmitted pulse. In many systems a frequency modulated pulse, referred to as a chirp, that is a linear frequency sweep is utilized to achieve high resolution without decreasing pulse duration. Chirps are interspersed with quiescent periods for reception. In polarimetric SAR systems, chirps are typically transmitted with alternating polarities.

In a strip map SAR system, azimuth resolution is typically dependent upon the length (or effective dimension) of the antenna. Reducing the length of the antenna increases azimuth resolution. Discrimination of targets based upon azimuth position is possible due to phase variation during the observation period. When the Doppler bandwidth is under-resolved (i.e. the pulse repetition rate is below the Nyquist rate of the anticipated Doppler bandwidth), aliasing can occur. Formation of a synthetic aperture without aliasing typically requires transmission of radar pulses at along track distances equal to or less than half the length of the antenna. Accordingly, the antenna length and the velocity of the platform to which the SAR is mounted determines a desired pulse repetition rate of the radar system to avoid aliasing.

There are two competing constraints on the pulse repetition rate of a SAR system. On one hand, if the pulses are transmitted too frequently, then reflections from more than one range will arrive at the receiver simultaneously, leading to range (cross-track) ambiguity. On the other, if pulses are not transmitted frequently enough, then the Doppler bandwidth will be under-resolved, leading to azimuth (along-track) aliasing and ambiguity.

For space-based SAR systems, orbital speed can be so high that a large antenna is required to enable a pulse repetition rate that is sufficiently low to avoid range ambiguity. Increasing the size of the antenna reduces azimuth resolution in strip map mode. The decrease in resolution can be offset by operating in spotlight mode with a consequent loss of collection area rate. Often, the resulting physical antenna is longer than signal-to-noise considerations alone would otherwise require. The requirement of a large antenna, coupled with typically tight antenna RF precision requirements, typically means that either an expensive rocket with a large payload fairing is required, or a large, high-precision structure must be unfurled in space, raising engineering and manufacturing costs and mission risk. And indeed, space-based SAR missions launched to date typically feature either a long, often segmented antenna, or a large deployed parabolic dish.

SUMMARY OF THE INVENTION

Synthetic aperture radar (SAR) imaging systems that transmit repeated waveforms based upon pseudonoise sequences to generate SAR imaging data in accordance with various embodiments of the invention are disclosed. A synthetic aperture radar in accordance with one embodiment of the invention includes: a transmitter configured to transmit superchirps, where the superchirp is generated by convolving a kernel with a pseudonoise modulated impulse sequence having a flat power spectrum; a receiver configured to receive backscatters of transmitted superchirps and digitize the received backscatters; and signal processing circuitry configured to perform matched filtering on digitized backscatters.

In a further embodiment, the transmitter is further configured to transmit superchirps of different durations.

In another embodiment, the transmitter is further configured to transmit superchirps of different durations by transmitting superchirps that have different stretch factors.

In a still further embodiment, the pseudorandom sequence is a quadratic residue sequence.

In still another embodiment, the signal processing circuitry is configured to perform matched filtering by performing channelized matched filtering.

In a yet further embodiment, the signal processing circuitry is configured to perform channel separation of the digitized backscatters.

In yet another embodiment, the signal processing circuity is configured to perform rolling channel separation of the digitized backscatters.

In a further embodiment again, the signal processing circuitry is configured to perform rolling channel separation by cyclically shifting the digitized backscatters by the ratio of a number of samples in one superchirp transmission period to the number of channels to produce separate channels.

In another embodiment again, the signal processing circuitry is configured to perform channelized matched filtering for each of the separate channels by utilizing matched filters that are cyclically shifting by a number of samples in one superchirp transmission period to the number of channels.

In a further additional embodiment, the signal processing circuitry is configured to perform squint processing on the digitized backscatters.

In another additional embodiment, the signal processing circuitry is configured to perform at least one squint processing process selected from the grout consisting of: a stretching process, and a shrinking process.

In a still yet further embodiment, the signal processing circuitry is configured to perform periodic blanking of the digitized backscatters.

In still yet another embodiment, the signal processing circuitry is configured to perform periodic blanking of sections of the digitized backscatters received during transmissions by the transmitter at a peak transmission power.

In a still further embodiment again, the transmitter is further configured to transmit superchirps on separate channels having different polarizations.

In still another embodiment again, the signal processing circuitry includes a processor configured by software.

Another further embodiment of a synthetic aperture radar includes: a transmitter configured to transmit superchirps of different durations, where superchirps of different durations are generated by convolving a kernel with different quadratic residue modulated impulse sequences that result in different stretch factors; a receiver configured to receive backscatters of transmitted superchirps and digitize the received backscatters; and signal processing circuitry. In addition, the signal processing circuitry is configured to: perform squint processing on digitized backscatters of transmitted superchirps to generate processed samples; perform rolling channel separation by cyclically shifting the processed samples by the ratio of the number of processed samples in one period to the number of channels to generate separate channels; and perform channelized matched filtering on the separate channels.

In still another further embodiment, the signal processing circuitry is further configured to perform periodic blanking.

A method of imaging using a synthetic aperture radar in accordance with an embodiment of the invention includes: transmitting superchirps using a transmitter, where the superchirp is generated by convolving a kernel with a pseudonoise modulated impulse sequence having a flat power spectrum; receiving backscatters of transmitted superchirps using a receiver; digitizing the received backscatters using an analog to digital converter; and performing matched filtering on the digitized backscatters using signal processing circuitry to generate synthetic aperture radar image data.

A further embodiment also includes transmitting superchirps of different durations using the transmitter.

In another embodiment, matched filtering is performed by performing channelized matched filtering.

BRIEF DESCRIPTION OF THE DRAWINGS

FIG. 2A is a time domain representations of a baseband in phase (I) channel of one period of an ordinary linear chirp.

FIG. 2B is a 59-impulse superchirp with a stretch factor very much greater than 1 generated in accordance with an embodiment of the invention.

FIG. 6 illustrates four consecutive receive periods and separation of the received samples into two or three channels by cyclically shifting the received samples in accordance with an embodiment of the invention.

DETAILED DESCRIPTION

Figure 1:
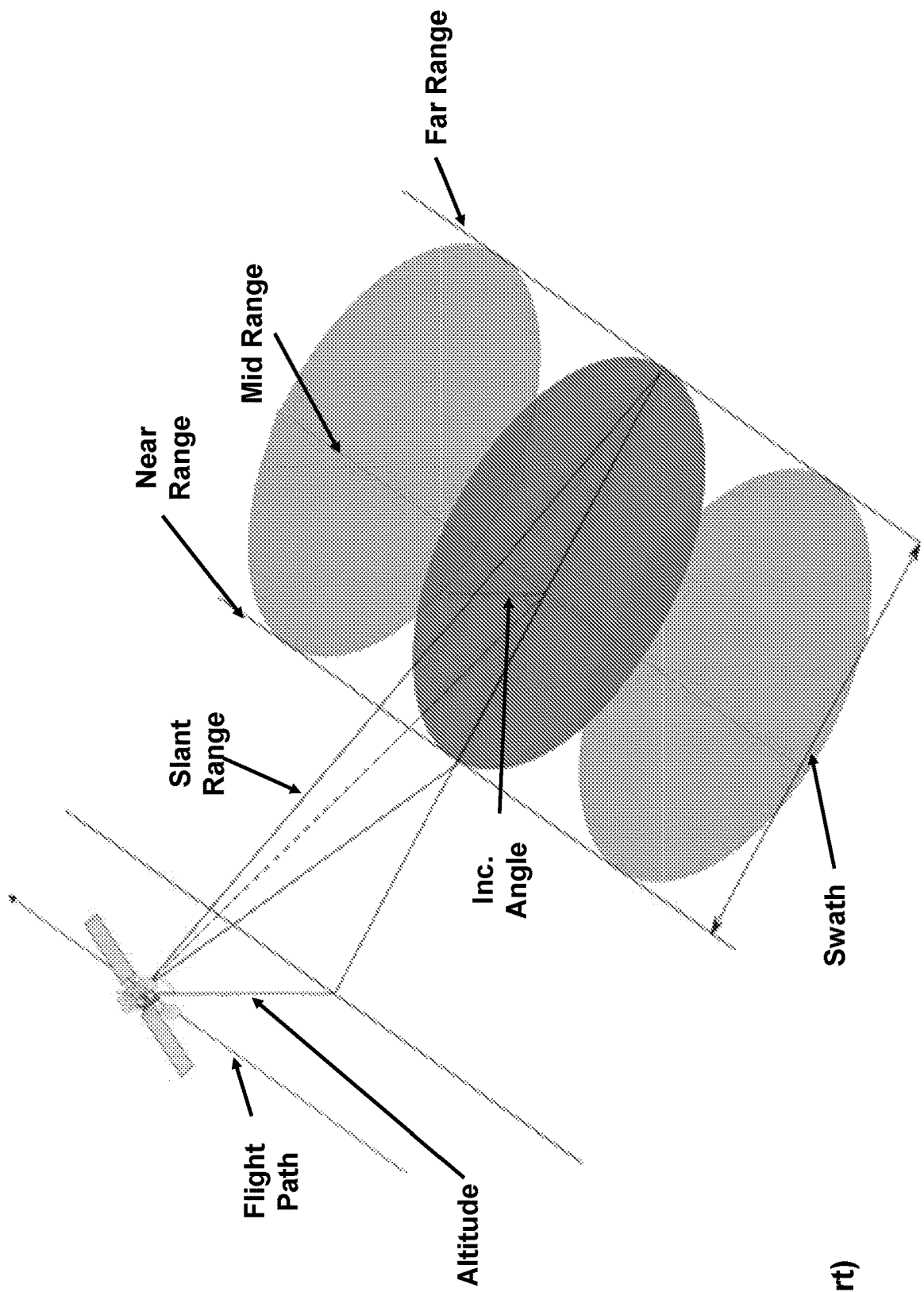
FIG. 1 conceptually illustrates a synthetic aperture radar.

Turning now to the drawings, synthetic aperture radar (SAR) imaging systems that transmit repeated waveforms based upon pseudonoise sequences in accordance with various embodiments of the invention are illustrated. The waveforms generated by convolving pseudonoise sequences with any of a variety of kernels can be referred to as superchirps. A benefit of superchirps is that backscattered superchirp reflections are amenable to channelized matched filtering, which means that the sampled received signal can be separated into a sufficient number of channels so that a channelized pulse repetition rate can be achieved that is higher than the transmitted pulse repetition rate. In this way, the use of superchirps enables the construction of a transmitter that can avoid aliasing at pulse repetition rates that are below the Nyquist rate.

In addition to performance gains through channelized matched filtering, SAR systems that utilize superchirps can achieve transmitter and receiver isolation by spacing transmission and reception. Blanking processes can be utilized to remove meaningless data collected by a receiver during periods in which a transmitter is transmitting at or near peak power. Loss of data at the ranges corresponding to these time periods can be avoided by transmitting superchirps having different durations. In many embodiments, the duration of the superchirp is modified using pseudonoise sequences having different spreading factors.

Use of superchirps within a SAR system enables use of shorter antenna lengths to increase azimuth resolution without the need to increase pulse repetition rates to avoid aliasing in a manner that would introduce range ambiguity. In this way, SAR systems that utilize superchirps are well suited to small platforms such as (but not limited to) small satellites.

The nature of superchirps, the manner in which they can be generated in accordance with various embodiments of the invention, and systems and methods for performing SAR imaging using superchirps in accordance with a number of embodiments of the invention are each addressed below.

Generation of Superchirps

In a number of embodiments, a superchirp signal can be generated using a pseudonoise sequence to spread transmission over a longer time period. A pseudonoise sequence is typically a binary sequence, which appears in a pattern that makes it noise-like. In certain embodiments, the pseudonoise sequence has a flat power spectrum. When a signal is convolved with a sequence with a flat power spectrum, then deconvolution of the signal will amplify noise equally at all frequencies because the deconvolution filter can have a flat spectrum. If a coding filter is used that does not have a flat spectrum, then the decoding filter typically must have a higher response at frequencies where the coding filter has a low response, amplifying noise at some frequencies more than others and leading to an overall loss in signal-to-noise performance. In several embodiments, the pseudonoise sequence is a complex-valued sequence.

In many embodiments, the pseudonoise sequence is a quadratic residue sequence. A number n is a quadratic residue mod p if there exists a number i such that $i^2 \equiv n \mod p$. When no such number exists then n is a quadratic non-residue mod p. All the quadratic residues mod p can be found by taking all numbers from 0 to $(p-1)/2$, squaring them, and taking the result mod p. When p is a prime number, there are $(p-1)/2$ quadratic residues and $(p-1)/2$ quadratic non-residues. A binary sequence, often referred to as a Legendre sequence, can be created based upon whether a number is a quadratic residue or a quadratic non-residue. In several embodiments, Legendre sequences are utilized as pseudonoise sequences for the purposes of generating a superchirp. The XOR addition of a Legendre sequence with a cyclically shifted replica of itself leads to another set of pseudonoise sequences referred to as Weil sequences. In a number of embodiments, Weil sequences are utilized as stretching sequences. In other embodiments, any of a variety of techniques can be utilized to generate a pseudonoise sequence for use as a stretching signal in accordance with the requirements of a given application including (but not limited to) periodic pseudonoise sequences including maximal length codes, or Walsh-Hadamard codes, and/or periodically-repeated random sequences.

In several embodiments, a pseudonoise sequence is selected so that the sequence results in the integral of a Dirac impulse in a uniformly-spaced finite sequence of such impulses. The pseudonoise sequence is convolved with a kernel of finite bandwidth, with appropriate apodization, to produce one period of a baseband modulation pattern. The kernel can effectively have any desired bandwidth and temporal roll-off characteristics. In several embodiments, a kernel is utilized that can be a Sinc function raised to any power (including to the power of 1), or a truncated Gaussian kernel, or even shorter linear FM chirps or Barker code patterns (the latter two involving addition of a preprocessing range compression step to the return signal processing chain). As can readily be appreciated, the specific kernel function largely depends upon the requirements of a given application. In many applications, the baseband modulation pattern must be of finite bandwidth due to regulatory and/or hardware constraints.

The product of the impulse spacing and the bandwidth of the superchirp can be referred to as the stretch factor. In many embodiments, a stretch factor greater than or equal to one (1) is utilized. A stretch factor of exactly one (1) implies Nyquist-rate sampling. Stretch factors greater than one (1) leave lulls in transmitted power during which the system can receive RF reflections without significant crosstalk. Increasing the stretch factor reduces the crosstalk isolation requirement, but comes at a cost to either average or peak power, since the length of the code is shorter (for a given total period length). The stretch factor is, therefore an adjustable parameter. In many embodiments, a stretch factor is utilized that is as close to 1 as practicable within the crosstalk limits of the system. As can readily be appreciated, any stretch factor appropriate to the requirements of a given application can be utilized in accordance with various embodiments of the invention.

In many embodiments, the superchirp described above is generated as a baseband I/Q signal by a signal generator, such as a software-defined radio or a hardware-defined radio. The baseband signals can be modulated onto a carrier frequency for transmission. Alternatively, the superchirp may be generated at an intermediate frequency and mixed to a carrier frequency for transmission. The superchirp period is selected to be long enough to cover the entire illuminated area at least once so as to eliminate range ambiguity. It may or may not be sufficient to prevent Doppler aliasing depending upon geometric and RF parameters. However, as is discussed further below, the properties of superchirps enable channelized matched filtering that can achieve a channelized repetition rate sufficient to prevent Doppler aliasing.

Referring to FIGS. 2A and 2B, time domain representations of a baseband in phase (I) channel of one period of an ordinary linear chirp shown in FIG. 2A is compared to a 59-impulse superchirp with a stretch factor very much greater than 1 in FIG. 2B.

While various superchirp signals are described above, any of a variety of signals having a pseudonoise or random-modulated impulse train convolved with one or more finite-bandwidth kernels can be utilized as appropriate the requirements of particular applications in accordance with various embodiments of the invention. In addition, several embodiments generate superchirps by convolving a pseudonoise sequence with multiple kernels at different center frequencies. SAR systems that utilize superchirps and systems for processing imaging data obtained by such SAR systems in accordance with various embodiments of the invention are discussed below.

SAR Satellite Systems

Figure 3:
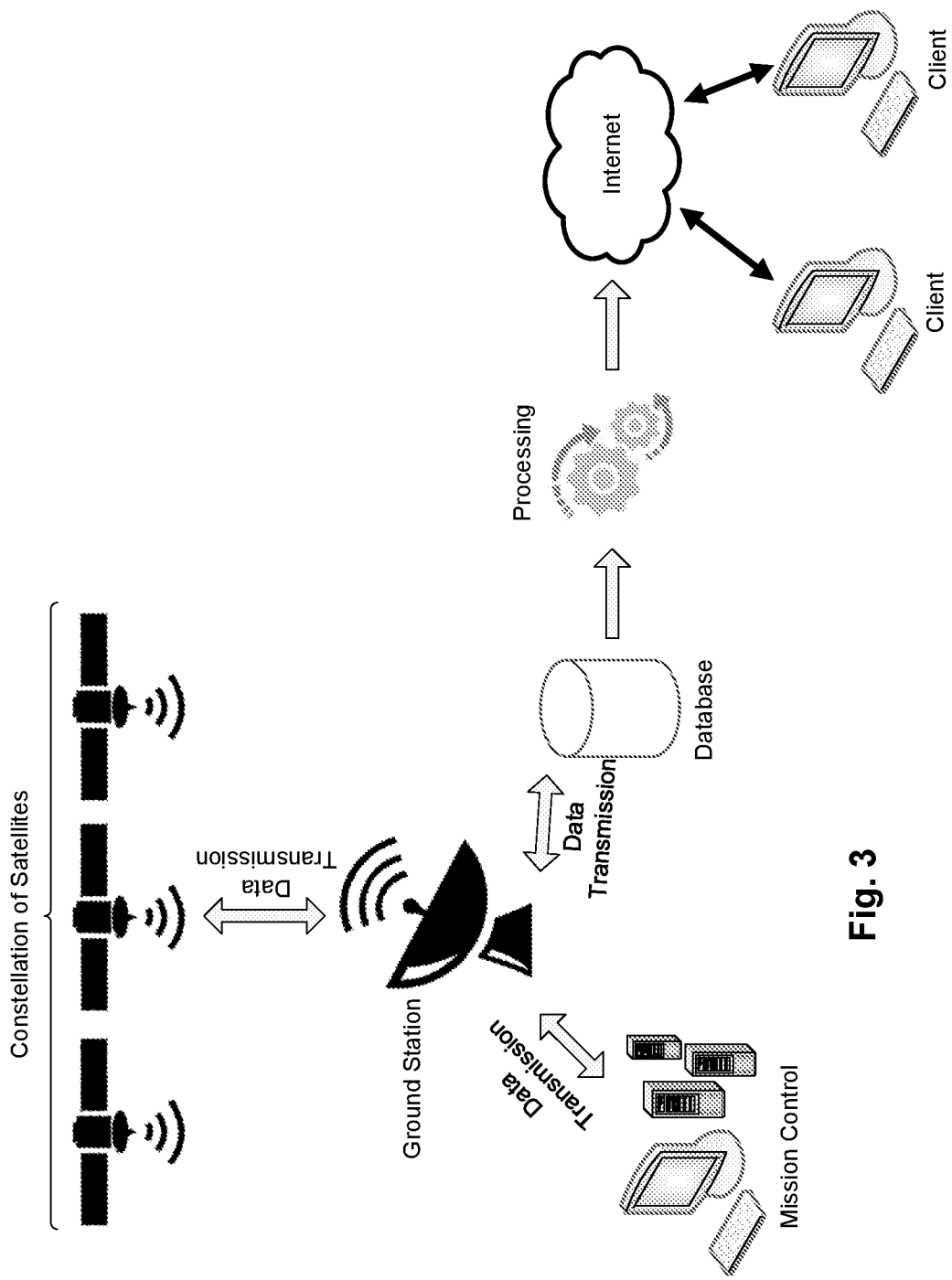
FIG. 3 illustrates a constellation of imaging satellites operable to collect SAR and communicate with a ground station in accordance with an embodiment of the invention.

Superchirp signals are particularly useful in SAR systems in which a small antenna is desirable. In many embodiments, small SAR imaging satellite systems are implemented that include a constellation of satellites, at least one of which includes a SAR system that utilizes superchirps and can operate in strip map and/or spotlight modes. In many instances, such satellite constellations can be used to aggregate SAR image data that can eventually be accessed by client devices. The satellites can interface with terrestrial systems to relay image data in any of a variety of configurations. Thus, for instance, FIG. 3 illustrates an imaging satellite system—whereby at least one satellite includes a SAR system that utilizes superchirps, and operable to image in strip map and/or spotlight modes—that interfaces with a single ground station. In particular, FIG. 3 illustrates a constellation of satellites operable to collect SAR data including (but not limited to) image data and/or raw or compressed SAR phase history data. The particulars of implementing SAR systems that utilize superchirps will be discussed in greater detail in subsequent sections. Any of a variety of satellite classes can be implemented in accordance with embodiments of the invention. For example, in many embodiments, small satellites are implemented. In a number of embodiments, more conventional satellites are implemented.

FIG. 3 illustrates that the constellation of satellites interacts with at least one Ground Station. Thus, for instance, the constellation of satellites can relay acquired imaging data as well as respective positioning information to the Ground Station. The at least one Ground Station can be used to communicate with the constellation of satellites generally, and more specifically to control the trajectory and operation of the various satellites within the constellation. Thus, for example, FIG. 3 illustrates that a Mission Control center can be used to interact with the at least one Ground Station and thereby control the operation of the constellation of satellites. Mission Control can be in wireless communication with the Ground Station or in wired communication with the Ground Station. In many embodiments, optical links and/or optical crosslinks are utilized to connect to the at least one Ground Station to facilitate high speed data transfer.

The Ground Station can also serve to relay received SAR data to a SAR data database. As before, the Ground Station can be in wired and/or wireless communication with the servers that ingest data into the SAR data database. The SAR image data database can then store the SAR data for subsequent use. For instance, the SAR data can be retrieved and processed by a server system that provides access to the SAR data to any of a variety of client applications, e.g. via the Internet. While the accessing of SAR data over the Internet is depicted, it should be clear that SAR data can be accessed via any suitable network. For example, in some instances, it can be accessed over a local area network. As can be appreciated, all data communications can be encrypted for security.

The above description provides a number of examples of SAR satellite systems that utilizes superchirps. But it should be appreciated that such systems can be implemented in any of a variety of configurations. For example, in many embodiments, multiple ground stations can be utilized to interface with the constellation of satellites. For instance, the multiple ground stations can be located around Earth. In many embodiments, the satellites within the constellation are operable to form a mesh network, whereby the satellites can communicate with each other. Thus, for example, satellites can relay data to one another, and also to a Ground Station. This configuration can allow a satellite to relay image data to a Ground Station even if the Ground Station is not within a line of sight of a satellite. By way of example, the satellite can relay SAR data to a second satellite that is within line of sight of the Ground Station, and the second satellite can thereafter relay the SAR data to the target Ground Station. Similarly, a Ground Station can communicate with a satellite that it does not have direct line of sight to using the mesh network. In this way, a mesh network can allow for operation using relatively fewer ground stations (e.g. since the satellites can function as communication relays). In certain embodiments, the satellites maintain an onboard collection of previous coherent or incoherent imagery of areas of interest and are able to process and compare the new imagery on board the satellite (in many instances without intervening ground support or ground processing). The satellites can then transmit smaller quantities of information, such as changes that appear to be significant, to the ground and/or to other satellites via the ground or mesh network, where time-sensitive response would be desired, such as for cueing purposes. Naturally, this could happen separately from, or in addition to, downlinking of other kinds of SAR data.

While a particular configuration has been illustrated, and variants have been discussed, it should be clear that any suitable system for implementing a constellation of satellites that include at least one SAR system, which utilizes superchirps, can be implemented in accordance with many embodiments of the invention. Implementations of SAR systems that utilize superchirps are discussed in greater detail below.

SAR Systems

SAR systems in accordance with various embodiments of the invention can utilize a number of different implementations for generating superchirps and receiving reflections of the transmitted superchirps backscattered by objects within a scene. In many embodiments the SAR system is implemented using an FPGA. In certain embodiments, the FPGA forms part of a software defined radio system. A software defined radio is a radio system where components that have traditionally been implemented in hardware (e.g. mixers, filters, amplifiers, modulators/demodulators, detectors, etc.) are instead implemented by means of software on a signal processing system. A typical software defined radio includes: a digital signal processing system, which is at least one processor configured by a digital signal processing software application; an analog-to-digital converter; and a digital-to-analog converter. Advantages of using software defined radios to implement SAR systems in accordance with various embodiments of the invention include (but are not limited to) the flexibility to use software to transmit different superchirp signals as discussed further below. The processor can take the form of an FPGA and/or a microprocessor. In a number of embodiments, the SAR system is configured to modify the transmitted superchirps based upon factors including (but not limited to) changes in the look angle of the radar, speed of the platform on which the radar is mounted, and/or altitude of the platform on which the radar is mounted. In several embodiments, the properties of the transmitted superchirp continuously varies during the orbit of a space-based platform. In several embodiments, as the orbit changes as well as during variations due to oblateness of Earth, gravitational inhomogeneity orbital eccentricity, and/or elevation, the superchirp variable spacing is adjusted to maintain unblanked coverage over the illuminated area.

Figure 4:
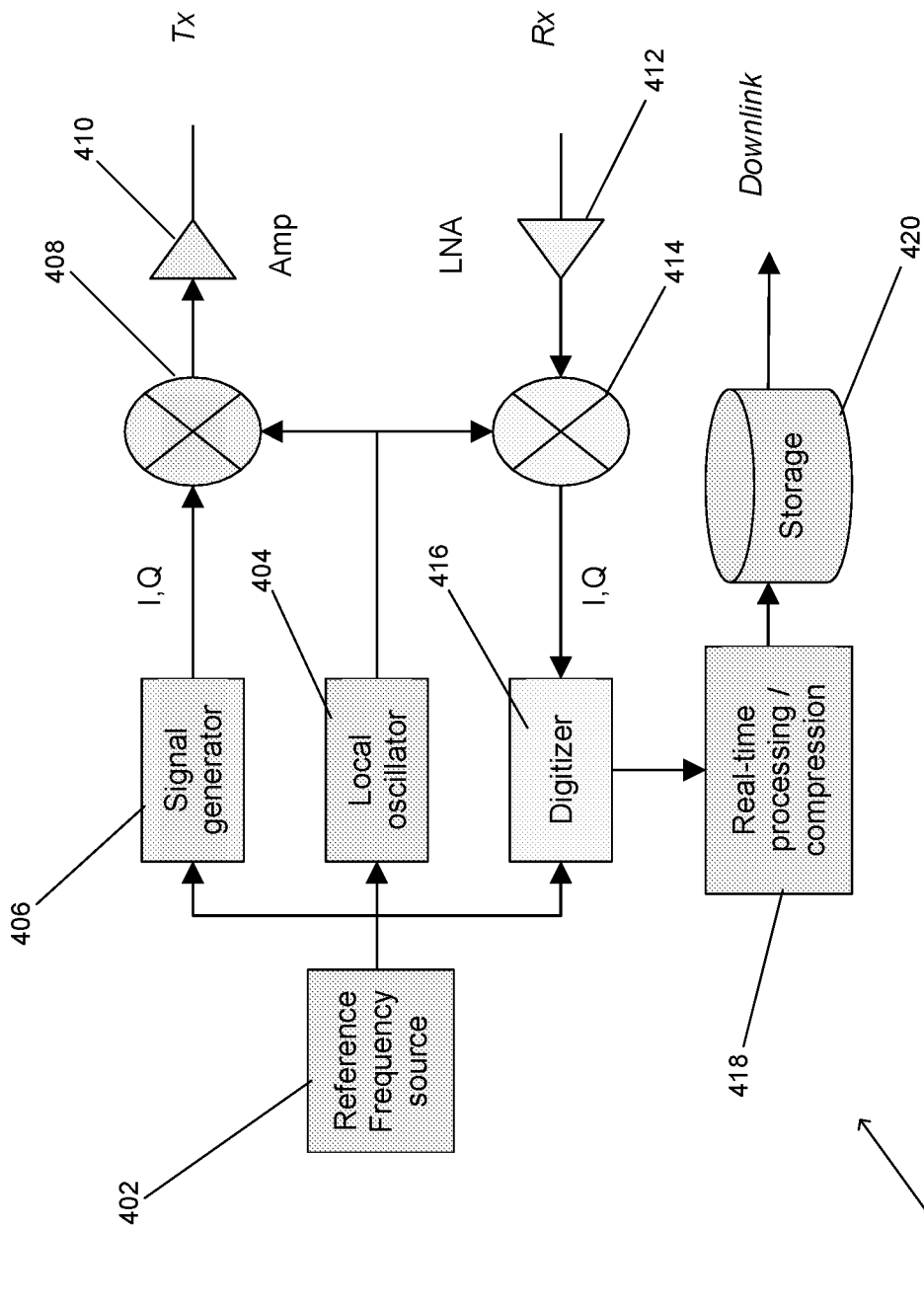
FIG. 4 illustrates a transmit and receive chain that can be implemented using a software defined radio in accordance with an embodiment of the invention.

A transmit and receive chain that can be implemented using a software defined radio in accordance with an embodiment of the invention is illustrated in FIG. 4. Both the transmit chain and the receive chain rely upon the ability of the SAR system 400 to generate a stable carrier signal. In the illustrated embodiment, a reference signal 402 that has a stable frequency is utilized to drive a local oscillator circuit 404. The local oscillator circuit 404 provides a sinusoidal carrier frequency to both the transmit and receive chains. The reference signal is also utilized to generate the baseband superchirp signal using a waveform generator 406. The baseband superchirp signal generated by the waveform generator 406 is mixed with the carrier frequency by a mixer 408 and the resulting RF signal is amplified by an RF amplifier 410 for transmission via an antenna system (not shown).

In the illustrated embodiment, the SAR system is monostatic and the antenna system also receives backscatters of the transmitted superchirps. In many embodiments, a bistatic or multistatic implementation can be utilized in which the Tx and Rx portions of the circuity would be separated with due care taken to match the frequency and timing of the reference signals utilized by each circuit. The received backscattered signals are amplified using a low noise amplifier 412 and the amplified signal is down mixed to baseband or an intermediate signal using a mixer 414 and the reference signal. The downmixed signal can be digitized using an analog-to-digital converter 416. The digitized data can then be processed in real time within the SAR imaging platform using a processing system 418 and/or stored in a storage device 420 for transmission via a downlink. In certain embodiments, the processing system is an FPGA and/or an alternative form of application specific circuit. In a number of embodiments, the processing system is a computing system including at least one processor and a set of machine readable instructions stored in memory that configure the processor to execute instructions to process the digitized signals received by the SAR system. The manner in which backscattered superchirps are processed is discussed further below.

While a variety of implementations of SAR systems that utilize superchirps are described above with reference to FIG. 4, any of a variety of hardware and/or software implementations can be utilized to implement a SAR system as appropriate to the requirements of a given application in accordance with various embodiments of the invention. For example, a SAR system that utilizes superchirps can be implemented using a high speed digital-to-analog converter that directly generates the transmitted superchirp signal without the need for up mixing to a carrier frequency. Similarly, received backscattered signals can be directly digitized using a high sample rate analog-to-digital converter without the need to down mix the received signals. The processing of received signals in a SAR system that utilizes superchirps in accordance with various embodiments of the invention is discussed further below.

Processing Received Superchirps

The manner in which received superchirp signals are processed can depend upon the pulse repetition rate. When the pulse repetition rate exceeds the Nyquist rate (i.e. the pulse repetition rate is sufficiently high so as to avoid aliasing), the digitized backscattered signals can be processed in a conventional manner using any of a variety of matched filter implementations appropriate for use in a SAR system. When the pulse repetition rate is below the Nyquist rate, SAR systems in accordance with many embodiments of the invention utilize rolling channel separation in the receiver to avoid aliasing in the received signals. In other embodiments, a certain amount of aliasing in the received signal is tolerated through the use of filtering.

Figure 5:
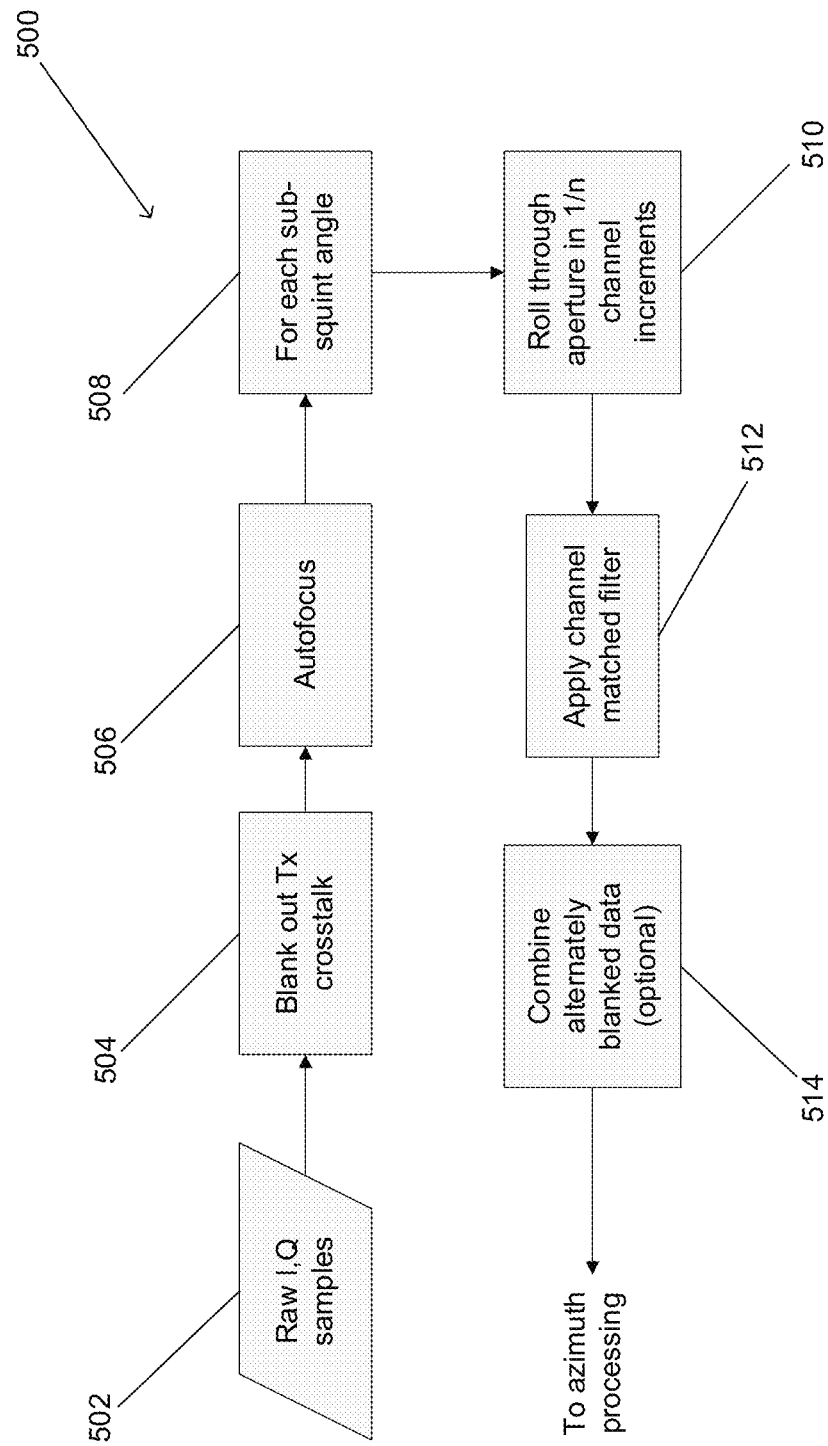
FIG. 5 is a flow chart illustrating a method for processing backscattered signals received by a SAR system using rolling channel separation in accordance with an embodiment of the invention.

A method for processing backscattered signals received by a SAR system using rolling channel separation in accordance with an embodiment of the invention is illustrated in FIG. 5. The process 500 includes receiving (502) raw in phase and quadrature samples. Crosstalk from intervals of peak transmit power are blanked out (504), followed by auto-focusing (506). Use of blanking to avoid crosstalk is discussed further below. Auto-focusing typically refers to the alignment of samples taken during successive receive periods to account for changes in range to a target. In many embodiments, auto-focusing is performed iteratively as part of the processing of the received backscatters. When the SAR system is side-looking some manner of squint preprocessing may be utilized. Many conventional SAR systems rely upon an assumption that targets do not move appreciably during a single chirp period. When a SAR system transmits a superchirp in accordance with any number of different embodiments of the invention, the assumption of effectively stationary targets may no longer hold. Indeed, a target may move 2πc or more in phase during a single superchirp transmission period. Accordingly, roll-off and nulls may be observed at certain azimuth angles, even in boresight systems. To balance expected amplitude azimuthally, SAR systems in accordance with many embodiments of the invention preprocess received samples to stretch or shrink or frequency-shift the data as necessary, rotating (508) each applicable squint angle to boresight for processing and recombining.

As mentioned above, the pulse repetition rate may not be high enough to avoid aliasing of the Doppler bandwidth. To avoid aliasing, the method 500 utilizes rolling channel separation (510). The transmitted waveform can be divided into two or more separate channels, allowing multiple temporally-overlapping superchirp backscatters to be processed in parallel. By offsetting the receive channels in time, the effective pulse repetition rate is multiplied by the number of channels, at a proportionate cost to signal-to-noise ratio. This process may also introduce a slight noise correlation. In this way, the antenna may be shortened in the along-track direction, making the beam wider. Under strip map collection, where the along-track resolution is proportional to the width of the beam, there is a corresponding increase in resolution. This is a significant improvement because strip map mode affords both simplicity and a high area collection rate compared to spotlight mode. The use of rolling channel separation in accordance with various embodiments of the invention is discussed further below.

Separate matched filters, which can be derived from the single channel matched filter, are applied (512) to each channel to generate an output based upon the samples within the channel during each receive time period. The matched filter indicates the presence of a reflection of a transmitted superchirp in the received signal. As can readily be appreciated the timing and/or phase at which the matched filtered outputs indicates the presence of a backscattered reflection provides information concerning the range and/or range rate of the object responsible for the backscattered reflection. After channelized matched filtering, the data look like any other match-filtered SAR return and may be azimuth-processed with conventional techniques such as polar reformatting. The specific azimuth processing utilized within a SAR system typically depends upon the requirements of a given application and can include (but is not limited to) subaperture processing, incoherent stacking (e.g. to reduce speckle) and/or separation into short temporal sequences (e.g. to understand motion in the image) in accordance with various embodiments of the invention.

While specific processes are described above with reference to FIG. 5, any of a variety of techniques for channelizing the received returns and performing channelized matched filtering can be utilized as appropriate to the requirements of specific applications in accordance with various embodiments of the invention. A number of processes that can be utilized to perform channel separation in accordance with various embodiments of the invention are discussed further below.

Channel Separation

Channel separation is performed in the received signal. Additional transmit channels may also be utilized within the system (e.g. polarimetry). However, the system need not utilize separate transmit channels. The received waveform may be divided into any number of channels so long as that number remains small compared to the number of Nyquist rate samples per superchirp period. When the single-channel superchirp does not adequately sample the Doppler bandwidth and would otherwise result in aliasing, the channel separation can result in a channelized pulse repetition rate at or above the Nyquist rate, making non-aliased image reconstruction possible Because reflection convolves the transmitted waveform with the scene, the Fourier convolution theorem implies that orthogonality can only be achieved by ensuring that the frequency-space support of each channel is nonzero only on a unique, non-overlapping domain. There are many ways this requirement might be satisfied; SAR systems in accordance with many embodiments of the invention satisfy it by dividing the domain into an integer number of offset frequency combs, of spacing equal to the number of channels. Each comb then gives the spectral content for its associated channel, but is correspondingly undersampled in frequency, leading to aliasing in time. However, linear combinations of the undersampled orthogonal channels yield the required number of correctly-sampled channels.

In certain embodiments, the SAR system utilizes a process that forms linear combinations of the undersampled orthogonal channels by performing a rolling channel separation process that cyclically shifts both the transmitted waveform and the matched filter by the ratio of the number of samples in one period to the number of channels. FIG. 6 illustrates four consecutive receive periods and separation of the received samples into two or three channels by cyclically shifting the received samples. With an arbitrary number of channels N, each piece of data is used in N different places, which can lead to noise correlations.

The pseudonoise property of the underlying waveform is what makes possible the separation of the received signal into separate channels using cyclical shifting. The transmitted superchirp has no unique center the way an ordinary chirp would, so any period-length sample is equivalent in terms of its transmitted and received power, and also has the same spectrum, making it equally suitable for matched filtering. Note that care must be taken regarding integer divisibility of the individual periods.

While various channel separation processes are described above with reference to FIG. 6, any of a variety of channel separation processes can be utilized to perform channelized matched filtering of backscattered superchirps as appropriate to the requirements of specific applications in accordance with various embodiments of the invention. For example, a set of scrambling processes and/or any other appropriate processes can be utilized to produce a set of orthogonal channels. The role that the stretch factor of the superchirps can play in cross-talk suppression in SAR systems implemented in accordance with many embodiments of the invention is discussed further below.

Reducing Cross-Talk

When sufficient Tx/Rx isolation can be achieved solely by physically spacing out the transmitter and receiver, or by careful RF engineering, then the superchirp would operate at a stretch factor of 1.0 (full duplex) to minimize the maximum power to average power ratio. However, such isolation is difficult to achieve in a monostatic system in practice, particularly from space, where the required transmitter power can be on the order of kilowatts. When full duplex operation of a SAR system is not possible, increasing the stretch factor beyond 1.0 leaves regular lulls in transmission power during which the receiver may operate without significant interference. The receiver may be protected during peak transmission power by, for example, a circulator or RF switch, or by physical separation, or by active cancellation, or by a combination of several such elements. With such protection measures in place, the value of the received signal during periods of peak transmitter power is not expected to be meaningful, and so its influence can be removed during signal processing.

To perform this removal, prior to matched filtering, the returned signal sample amplitude can be multiplied by a periodic function which reaches zero (0) during periods of peak transmit power and one (1) during lulls. In several embodiments, a sinusoidal function is utilized. In other embodiments, any of a variety of functions including (but not limited to) a smoothed square wave, and/or a sinusoidal function raised to a power greater than one (1) are utilized. The removal of samples corresponding to periods of peak transmitter power from the matched filter input has the unfortunate side-effect of zeroing out targets at ranges whose round-trip time coincides with an integer number of impulse periods; these appear as blank rows in range. To fill in the gaps, the round-trip interval between transmit and receive can be varied by one half impulse-spacing. Such adjustment can be achieved in a variety of ways. In several embodiments, the variation in impulse-spacing is accomplished by slightly increasing the stretch factor of the superchirp in every other period and/or gradually over a number of periods. The minimum pulse repetition frequency is increased in such a system to avoid aliasing; the channel count may be increased as necessary. In addition, the receiver process is configured to modify the matched filters utilized to perform channelized matched filtering as appropriate to the change in the stretch factor of the superchirp. Alternatively, simply accepting zeroed-out alternate rows may be sufficient for some applications.

Adaptations for Polarimetry

When quad polarimetry is desired, then SAR systems implemented in accordance with various embodiments of the invention can transmit two different polarizations. This may be effected by separating the transmitted waveform into two orthogonal channels as described earlier, and then transmitting each simultaneously and/or by alternating polarities. The received signal may then be further subdivided into additional channels as necessary.

Data Compression

In addition to common SAR data compression techniques, blanking and pre-channelization processing offer opportunities to reduce the downlinked data volume, as blanked regions contain little to no valuable signal information, and channelization would otherwise introduce redundant information. The system exploits these economies.

Application to Other Kinds of Pulse-Doppler Radar

SAR is not the only pulse-Doppler radar technique in which superchirps and/or channelized matched filtering can be utilized. Pulse-Doppler radar systems that utilize superchirps and/or channelized matched filtering can include (but are not limited to) ship, ground, aircraft, planetary defense radar, and/or any other radar where both long range (distance) and a large variety of resolvable speeds are desirable.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A synthetic aperture radar, comprising:
   a transmitter configured to transmit superchirps, where the superchirp is generated by convolving a kernel with a pseudonoise modulated impulse sequence having a flat power spectrum;
   a receiver configured to receive backscatters of transmitted superchirps and digitize the received backscatters; and
   signal processing circuitry configured to perform matched filtering on digitized backscatters.

2. The synthetic aperture radar of claim 1, wherein the transmitter is further configured to transmit superchirps of different durations.

3. The synthetic aperture radar of claim 2, wherein the transmitter is further configured to transmit superchirps of different durations by transmitting superchirps that have different stretch factors.

4. The synthetic aperture radar of claim 1, wherein the pseudorandom sequence is a quadratic residue sequence.

5. The synthetic aperture radar of claim 1, wherein the signal processing circuitry is configured to perform matched filtering by performing channelized matched filtering.

6. The synthetic aperture radar of claim 5, wherein the signal processing circuitry is configured to perform channel separation of the digitized backscatters.

7. The synthetic aperture radar of claim 6, wherein the signal processing circuity is configured to perform rolling channel separation of the digitized backscatters.

8. The synthetic aperture radar of claim 7, wherein the signal processing circuitry is configured to perform rolling channel separation by cyclically shifting the digitized backscatters by the ratio of a number of samples in one superchirp transmission period to the number of channels to produce separate channels.

9. The synthetic aperture radar of claim 8, wherein the signal processing circuitry is configured to perform channelized matched filtering for each of the separate channels by utilizing matched filters that are cyclically shifting by a number of samples in one superchirp transmission period to the number of channels.

10. The synthetic aperture radar of claim 1, wherein the signal processing circuitry is configured to perform squint processing on the digitized backscatters.

11. The synthetic aperture radar of claim 10, wherein the signal processing circuitry is configured to perform at least one squint processing process selected from the grout consisting of: a stretching process, and a shrinking process.

12. The synthetic aperture radar of claim 1, wherein the signal processing circuitry is configured to perform periodic blanking of the digitized backscatters.

13. The synthetic aperture radar of claim 12, wherein the signal processing circuitry is configured to perform periodic blanking of sections of the digitized backscatters received during transmissions by the transmitter at a peak transmission power.

14. The synthetic aperture radar of claim 1, wherein the transmitter is further configured to transmit superchirps on separate channels having different polarizations.

15. The synthetic aperture radar of claim 1, wherein the signal processing circuitry includes a processor configured by software.

16. A synthetic aperture radar, comprising:
a transmitter configured to transmit superchirps of different durations, where superchirps of different durations are generated by convolving a kernel with different quadratic residue modulated impulse sequences that result in different stretch factors;
a receiver configured to receive backscatters of transmitted superchirps and digitize the received backscatters; and
signal processing circuitry configured to:
perform squint processing on digitized backscatters of transmitted superchirps to generate processed samples;
perform rolling channel separation by cyclically shifting the processed samples by the ratio of the number of processed samples in one period to the number of channels to generate separate channels; and
perform channelized matched filtering on the separate channels.

17. The synthetic aperture radar of claim 16, wherein the signal processing circuitry is further configured to perform periodic blanking.

18. A method of imaging using a synthetic aperture radar, comprising:
transmitting superchirps using a transmitter, where the superchirp is generated by convolving a kernel with a pseudonoise modulated impulse sequence having a flat power spectrum;
receiving backscatters of transmitted superchirps using a receiver;
digitizing the received backscatters using an analog to digital converter; and
performing matched filtering on the digitized backscatters using signal processing circuitry to generate synthetic aperture radar image data.

19. The method of claim 18, further comprising transmitting superchirps of different durations using the transmitter.

20. The method of claim 18, wherein matched filtering is performed by performing channelized matched filtering.

* * * * *